(12) United States Patent
Kulyk et al.

(10) Patent No.: US 8,665,737 B2
(45) Date of Patent: Mar. 4, 2014

(54) CONVERSATIONAL INTERACTIVITY MEASUREMENT AND ESTIMATION FOR REAL-TIME MEDIA

(75) Inventors: Valentin Kulyk, Taby (SE); Mats Folkesson, Taby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 286 days.

(21) Appl. No.: 12/990,222

(22) PCT Filed: Apr. 17, 2008

(86) PCT No.: PCT/SE2008/050437
§ 371 (c)(1), (2), (4) Date: Oct. 29, 2010

(87) PCT Pub. No.: WO2009/128753
PCT Pub. Date: Oct. 22, 2009

(65) Prior Publication Data
US 2011/0044200 A1    Feb. 24, 2011

(51) Int. Cl.
  *H04L 12/66* (2006.01)
  *H04L 1/00* (2006.01)
  *H04B 1/56* (2006.01)
  *H04J 1/16* (2006.01)

(52) U.S. Cl.
  USPC ............ 370/252; 370/352; 370/276; 370/235

(58) Field of Classification Search
  USPC ......... 370/252, 276–277, 282–289, 352–354, 370/400–402, 419–421, 434, 458, 463, 370/465–466, 469, 235; 704/270
  See application file for complete search history.

(56) References Cited

U.S. PATENT DOCUMENTS

| 5,999,525 | A  | * | 12/1999 | Krishnaswamy et al. ..... 370/352 |
| 8,184,537 | B1 | * | 5/2012  | Gopal et al. .................. 370/235 |
| 2004/0081106 | A1 | * | 4/2004 | Bruhn ............................ 370/276 |
| 2007/0025264 | A1 | * | 2/2007 | Cheng et al. .................. 370/252 |

FOREIGN PATENT DOCUMENTS

| EP | 1427154 A1 | 6/2004 |
| WO | 2008023303 A2 | 2/2008 |

\* cited by examiner

Primary Examiner — Jung Park
Assistant Examiner — Chuong M Nguyen
(74) Attorney, Agent, or Firm — Coats and Bennett, PLLC

(57) ABSTRACT

An apparatus (300) and method (400) provides an adaptive end-to-end (E2E) delay threshold (DT) for one-way transmission of information blocks in an information stream of a conversation. Information streams of the conversation are monitored (410), and the E2E DT duration is determined based on detected occurrences of one or more interactive properties 5 associated with the information streams of the conversation (412). Using the adaptive E2E DT duration value, a determination is made as to whether to perform at least one Quality of Service (QoS) function (416).

25 Claims, 4 Drawing Sheets

200
CONVERSATIONAL INTERACTIVITY MEASUREMENT AND ESTIMATION FOR REAL-TIME MEDIA

FIELD OF THE INVENTION

The present invention relates to managing delivery of media, and more particularly, to a method and system in which delay is adjusted based on conversational interactivity to apply a corresponding amount of quality of service to real time media.

BACKGROUND

It is a time critical task to process and deliver real-time media, such as conversational media. The main general task for conversational system designs and solutions is to keep end-to-end (E2E) delay (also sometimes called "mouth-to-ear" delay) as low as possible.

Different media processing and transport algorithms or solutions are used to improve media and services quality. Some examples of these improvements include the jitter buffer, bit and transport block error correction algorithms, retransmission algorithms etc. However, almost all such processing algorithms aimed to improve service and media qualities introduce additional latencies, and therefore lead to increases in E2E delay.

Current approaches in system design typically try to find ways to trade off E2E delay for perception of quality of service (QoS). However, it is becoming increasingly difficult to maintain a balance between E2E delay and QoS measures because transport of real-time voice traffic involves latency constraints, bit errors, packet data jitter and data loss.

Bit errors and packet data losses are handled primarily through a variety of different forward error correction (FEC) algorithms and local repair at the receiver. The basic principle of FEC is simply that audio frames or packets contain information related to earlier or later speech samples in addition to the distinct speech samples. This additional information can be used to reconstruct missing or erroneous speech samples. However, this solution implies added delay that would be attributed to waiting for the arrival of additional information needed to repair or reconstruct the speech data.

Packet data jitter occurs when audio and/or video packets arrive at the receiver at times that vary from an expected or "ideal" position in time. Upon playback, the jitter results in a jerky playback of the video frames or noticeable decrease in voice quality. Jitter may be compensated by means of a jitter buffer, which involves building a buffer of incoming packets at the decoder to smooth out the incoming jitter. However, buffering the incoming packet necessarily adds delay to the link.

The tradeoff between the use of these algorithms and schemes, and the desire to keep E2E delay as low as possible is typically addressed by using delay thresholds (DT) for algorithm design and latency limit. It is assumed that when E2E delay is kept below a predetermined DT, latency introduced by QoS algorithms and schemes and E2E delay levels would not be detected or perceived by human subjects (i.e., perceived as a service quality impairment).

A DT is commonly determined using subjective test data collected during extensive and costly subjective tests, which are usually carried out according to ITU recommendations. After determining a DT, system and processing circuits are designed using the subjectively defined and hard (fixed) DT.

SUMMARY

In accordance with embodiments of the invention, a method and apparatus controls an amount of quality of service (QoS) processing applied to a data stream of a conversation based on an adaptive end-to-end (E2E) delay time. The E2E delay time is based on an estimate of which delay time is convenient to the conversation condition in real-time, which may be determined based on measurements of conversation activity properties.

In one aspect, an apparatus for controlling perceived QoS comprises a packet-switched communication circuit that transmits and/or receives packet-switched information streams of a conversation. Each of the information streams is transmitted from a different participant and includes a series of information blocks. The apparatus includes a processing unit and memory that stores an adaptive delay threshold (DT) program module. The DT program module causes the processing unit to monitor the information streams for at least one interactivity property and store data related to detected occurrences of each interactive property. The memory also includes at least one QoS program module, wherein the adaptive DT program module determines an E2E delay time duration amount based on the detected occurrences, and whether to allocate an amount of the determined E2E delay time duration to perform at the least one QoS application.

Other aspects involve a method for controlling perceived quality of service (QoS). The method includes monitoring information streams of a conversation for at least one interactivity property, where each of the information streams originates from a different participant. When occurrences characteristic of at the least one interactivity property associated with the information streams of the conversation are detected while monitoring the conversation, these are used to determine an E2E delay time duration amount, and an amount of the determined E2E delay time duration to perform at least one QoS application.

It is to be understood that both the foregoing general description and the following detailed description are exemplary and exemplary only and are not restrictive of the invention, as claimed.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention. In the drawings.

DETAILED DESCRIPTION

The various aspects are described hereafter in greater detail in connection with a number of exemplary embodiments to facilitate an understanding of the invention. However, the invention should not be construed as being limited to these embodiments. Rather, these embodiments are provided so that the disclosure will be thorough and complete, and will fully convey the scope of the invention to those skilled in the art.

Many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions, such as program modules, being executed by one or more processors, or by a combination of both. Moreover, the invention can additionally be considered to be embodied within any form of computer readable carrier, such as solid-state memory, magnetic disk, and optical disk containing an appropriate set of computer instructions, such as program modules, and data structures that would cause a processor to carry out the techniques described herein. A computer-readable medium would include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (EPROM or Flash memory), or any other medium capable of storing information. Thus, the various aspects of the invention may be embodied in many different forms, and all such forms are contemplated to be within the scope of the invention.

Furthermore, it should be emphasized that the terms "comprises" and "comprising," when used in this specification, are taken to specify the presence of stated features, integers, steps or components; but the use of these terms does not preclude the presence or addition of one or more other features, integers, steps, components or groups thereof.

Figure 1:
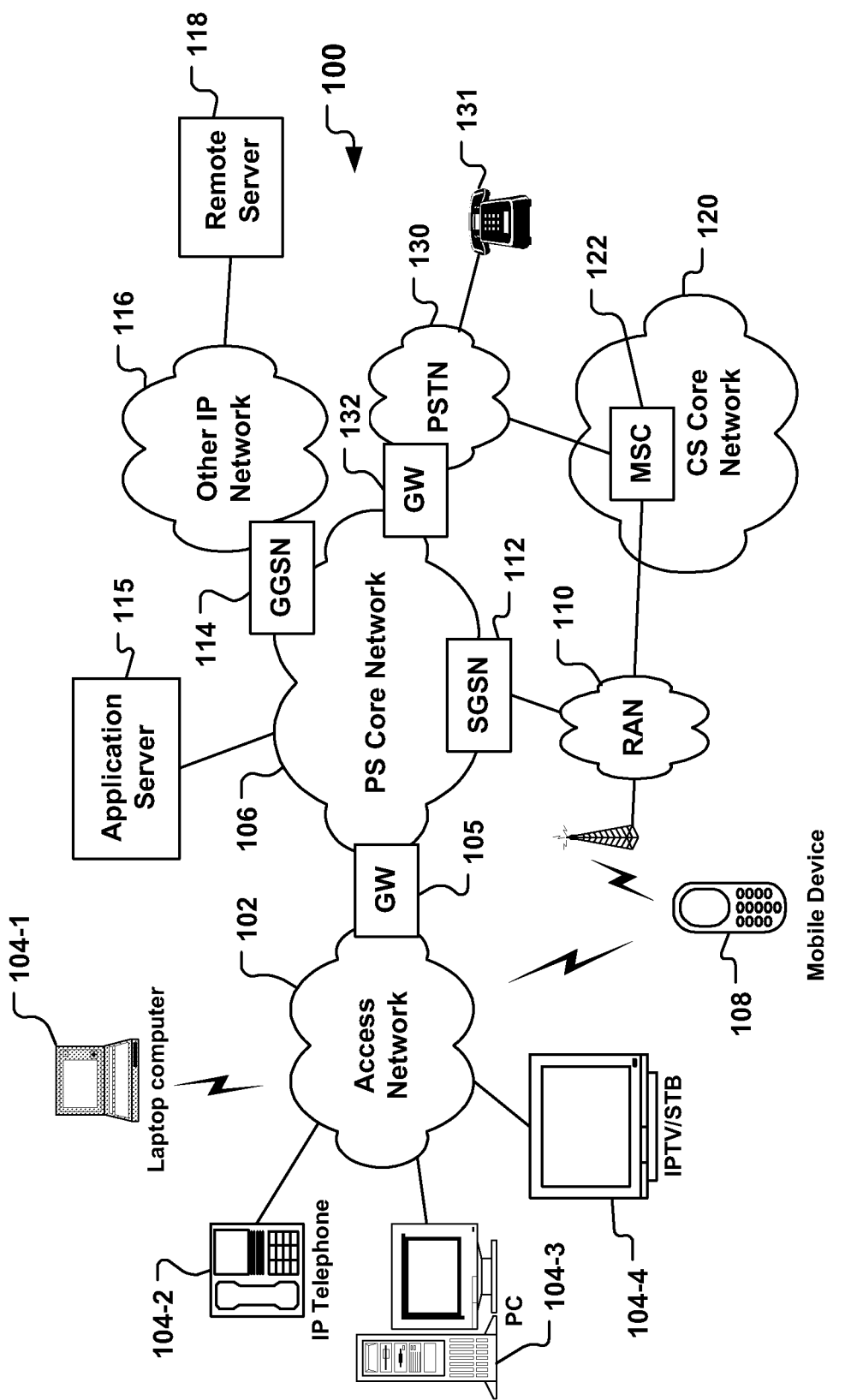
FIG. 1 is a diagram of an exemplary communications network in accordance with some embodiments.

FIG. 1 depicts an exemplary network environment 100 in accordance with some embodiments in which E2E delay in a conversation data stream between communication devices is adjusted based on conversational interactivity, and a corresponding amount of quality of service is applied to the data stream. As depicted in FIG. 1, the network environment 100 includes an Access Network 102, which may be comprised of a number of access technologies available to one or more communications devices. For purposes of the present disclosure, a "communications device" may be any tethered or untethered communications device, and may include any personal computer (e.g., desktops, laptops, palmtops, notebooks, television or handheld computing devices) equipped with a suitable wireless modem or a mobile communications device (e.g., cellular phones or data-enabled handheld devices capable of receiving and sending messages, web browsing etc.), or any enhanced PDA device or integrated information appliance capable of email, video mail, Internet access, corporate data access, messaging, calendaring and scheduling, information management, and the like. The communications devices may be capable of operating in multiple modes (e.g., Dual Transfer Mode (DTM) or Multi-Radio Access Bearer (RAB) terminals) in that they may engage in both circuit-switched (CS) as well as packet-switched (PS) communications, and can transition from one mode of communications to another mode of communications without loss of continuity.

The Access Network 102 may include a plurality of nodes for providing access to an Internet protocol (IP) Core Network (CN) 106 and may include both CS and PS networks, which may involve wireless technologies, wireline technologies, broadband access technologies etc. For example, reference numeral 104-1 refers to a communication device in the form of a laptop computer that uses a wireless local area network (WLAN), Worldwide Interoperability for Microwave Access (WiMAX) technology, Wi-Fi or another radio access technology selected from IEEE 802.x technology. Communication devices 104-2 to 104-4, which respectively depict an IP telephone, personal computer (PC) and IPTV and/or set top box (STB), may be connected to the IP Core 106 using some other network access technology such as xDSL access through Ethernet routes (e.g., metro Ethernet) connecting CE to a Broadband Access Server (BRAS) (e.g., through a Digital Subscriber Line Access Multiplexer (DSLAM)).

A gateway (GW) 105 provides an interface between the Access Network 102 and PS CN 106, and converts protocols among these networks. Through the GW 105, the PS CN 106 may connect a communications device to other IP networks, such as IP Network 116 (e.g., the Internet), or to an Application Server (AS) 115 that provides services and/or media content.

The communication device 108 depicted in FIG. 1 is a mobile terminal, such as a mobile phone, PDA etc., that communicates with the IP Core Network 106 via a radio access network (RAN) 110. The RAN 110 typically includes one or more Base Station (BS) and Base Station Controllers (BSCs), or Node Bs and radio network controllers (RNCs), which are conventional. The RNCs control various radio network functions, including for example radio access bearer setup, diversity handover among BSs, etc. More generally, each RNC directs calls to and from a mobile terminal via the appropriate BSs, which communicate with each other through downlink (i.e., base-to-mobile or forward) and uplink (i.e., mobile-to-base or reverse) channels. Each BS serves a geographical area that is divided into one or more cell(s) and is typically coupled to its corresponding RNC by dedicated telephone lines, optical fiber links, microwave links, etc. The communication device 108 may be capable of DTM such that it may communicate with other communications devices connected on network 100 either via the Access Network 102 or the RAN 110.

The RAN 110 may connect to the IP CN 106 and its entities, which may include a GPRS support node (SGSN) 112, a Gateway GPRS support node (GGSN) 114, and another IP Network 116 (e.g., the Internet) and other entities, such as Remote Server 118. For example, cellular networks may connect through a Node B interface in an UMTS terrestrial RAN (UTRAN)), through an eNodeB (eNB) interface in an Evolved UTRAN (E-UTRAN), Global System for Mobile Communication (GSM)/enhanced data rate for GSM evolution (EDGE) RAN (GERAN) connecting through RAN 110 and the servicing SGSN 112 and GGSN 114, and Wideband Code Division Multiple Access (WCDMA) networks, although it is envisaged that the teachings hereof may be extended to any $3^{rd}$ Generation Partnership Project (3GPP)-compliant cellular network (e.g., 3GPP or 3GPP2) as well.

The RAN 110 also may connect to a circuit switched (CS) Core Network (CN) 120 and its entities, such as the Mobile Switching Center (MSC) 122 and other entities (e.g., a Home Location Register (HLR), Visitor Location Register (VLR) connected via a signaling network such as a Signaling System No. 7 (SS7), although the HLR may be replaced with a more centralized server, such as a Home Subscriber Server (HSS) that stores subscriber-related data and is shared between the IP CN and CS CN). The MSC is used for connecting phone calls to the Public Switched Telecommunications Networks (PSTN) 130. The PSTN may communicate with the PS CN 106 through a GW 132 that translates among protocols used in the PS CN 106 and PSTN 130, and provides access for legacy telephone and dial up services 131.

As communication technologies continue to shift from circuit-switched to packet-switched networks, the merging of data transport with real-time applications continues to present challenges with respect to acceptable delay and perceived Quality-of-Service (QoS). In real-time conversational communications, excessive delay may disturb the natural flow of the dialog between two or more persons dynamically exchanging information in an interactive fashion. The nature of this dynamic interaction is characterized by rhythms and other parameters that indicate how human subjects tend to perform exchange of information.

A particular setting also may influence the manner in which a conversation is conducted. For example, the conversation may involve only two people, or a multi-party conferencing event that involves more than two speakers. Additionally, a conversation may occur in a classroom or lecture setting in which a one speaker generally has control of the conversation (e.g., a central speaker controls "the floor") and may be interrupted by or occasionally pause for responses from audience members. Also, cultural practices and/or manners of some societies or individuals tend to influence the manner in which conversations occur. For instance, people in some urban societies find it somewhat acceptable to interrupt one another during conversations while those in some rural societies generally tend to avoid interruptions.

In embodiments described herein, conversation interactivity properties are tracked, for example, by monitoring and measuring interactivity features to provide conversation liveliness indicators. These indicators may be used to detect or determine whether conversational conditions indicate shorter E2E delay would be required or longer delay would be acceptable (or unperceivable). Because two or more subjects can take part in a conversation that deploys one media (e.g. speech only, video only in case of sign language, text etc.) or multimedia (e.g., video telephony), interactivity tracking may be designed differently depending on these circumstances. For example, in cases in which audio and video are used for the conversation (e.g. video telephony), the audio and video conversational interactivity may be considered.

Figure 2A:
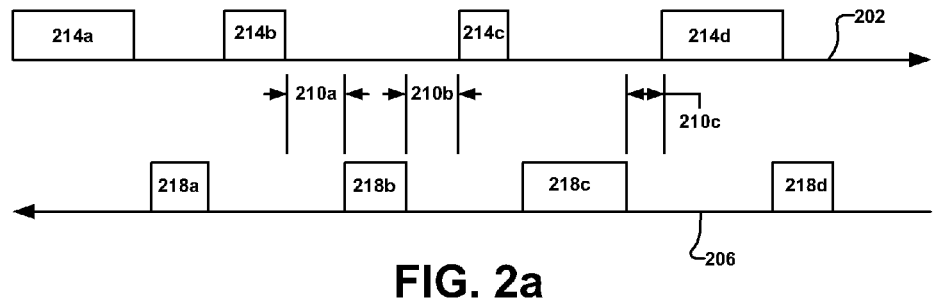
FIGS. 2a to 2c are diagrams illustrating exemplary measurable interactivity properties present during a conversation.
Figure 2B:
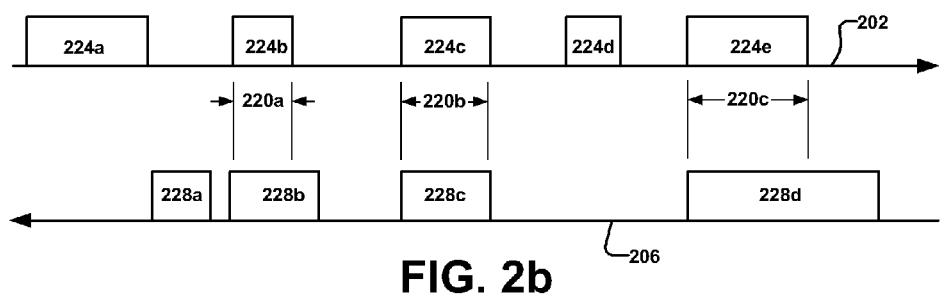
Figure 2C:
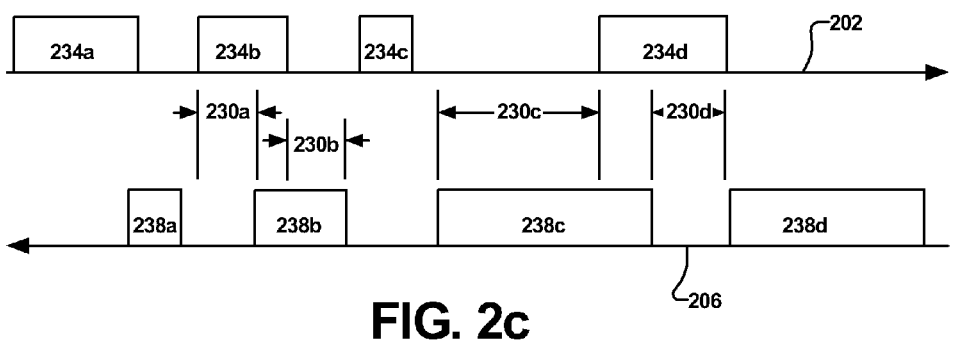

FIGS. 2a to 2c illustrate exemplary conversation interactivity characteristics, which may be measured by tracking several properties related to activity of a conversation. In FIGS. 2a to 2c, time lines 202 and 206 are shown as including arrows to indicate the "direction" of the information of the conversation (i.e., outgoing and incoming information), but the passage of time increases from left to right for both time lines. While several exemplary measurable interactivity properties present during a conversation between end users that may define the interactivity state of the conversation are described herein, other measurable interactivity properties and/or combinations thereof will be apparent to those skilled in the art. Additionally, while the depicted conversations show only two participants, the same or similar concepts may be applied when more than two participants are involved in a conversation.

FIG. 2a shows exemplary time durations and a distribution of "mutual silence" (MutS) time periods, which are a basic measurable conversational interactivity feature that occurs when participators are waiting for each other to react or answer some question. This "silence" word is related only to the conversation and may be filled by some background noise that belongs to the participators environment (e.g., acoustical noise). The difference between MutS time and round trip time (RTT) introduced by the communication system indicates how long delay is not perceivable.

As shown in FIG. 2a, MutS time periods are the periods of time 210a-210c between information blocks (talkspurts) 214a-214d in a first direction (i.e., originating from a first user) along time line 202, and information blocks 218a-218d in a second direction (i.e., originating from a second user) along time line 206, which occur during a conversation between end users (not shown). More specifically, FIG. 2a shows a MutS time period 210a defined between information blocks 214b and 218b, a MutS time period 210b defined between information blocks 218b and 214c, and a MutS time period 110c defined between information blocks 218c and 214d. Additional MutS time periods may be present, but are not shown for clarity of illustration. During the MutS times 210a-210c, participants are not speaking and/or do not providing other information through video (i.e., the information blocks along time lines 202 and 206 do not overlap in time during a MutS time period). Each of the MutS time periods 210a-210c shown in FIG. 2a includes the system introduced RTT and subjective response time (i.e., the subject's time for consideration).

FIG. 2b shows the frequency and duration of another measurable interactivity property called double-talk (DbT) time. DbT time is a period during conversational information exchange in which two or more participants of the conversation talk simultaneously through audio, video or audio video. As shown in FIG. 2b, DbT times are shown by overlapping areas 220a-220c during a conversation between two end users (not shown) communicating with one another via information blocks 224a-224e in a first direction (i.e., originating from a first user) along time line 202, and information blocks 228a-228d in a second direction (i.e., originating from a second user) along time line 206. More particularly, FIG. 2b shows the DbT time period 220a occurring during an overlap of talkspurts 224b and 228b, DbT time period 220b occurring during an overlap of talkspurts 224c and 228c, and DbT time period 220c occurring during an overlap of talkspurts 224c and 228d. Because many humans desire or need feedback signs that confirm communication has succeeded, a number of DbT situations may occur that is not related to a higher interactivity characteristic of the conversation.

Another measurable property for interactivity measurement concerns whether participators tend to start one-talk (OnT) parts of a conversation during mutual silence period or double talk period. An OnT period is defined as time period when only one participator is talking (or providing visual information in case of audio video conversation). FIGS. 2a and 2b show a number of OnT periods in which only one user is actively conversing (i.e., the OnT periods are parts of information blocks of one participant that do not overlap in time with information blocks originating from another participant). Also, participators tend to interrupt each other resulting in a DbT occurrence.

FIG. 2c shows the measurable phenomenon of OnT periods 230a-230c between information blocks 234a-234d and information blocks 238a-238d. There are additional OnT time periods in the conversation of FIG. 1c, but for purposes of practical illustration they are not labeled. As shown in FIG. 1c, OnT period 230a begins during a MutS time period and ends around the time when talkspurt 238b begins and interrupts talkspurt 234b. The OnT period 230b begins during a DbT time between talkspurts 234b and 238b and ends before the information block 234c begins. A similar scenario defines OnT periods 230c and 230d, but the talkspurt 230d ends after a period of time when the participant associated with timeline 202 ends talkspurt 234d (and an OnT continues with talkspurt 238d). As can be seen, OnT periods often result from interruptions by a non-conversing participant within the conversational information exchange.

While not shown in FIGS. 2a-2c, a "pause" MutS period may occur between two information blocks of the same speaker, as well as non-interrupted DbT periods in which the original speaker does not give up the floor despite an intermediate DbT period.

The interactivity of an ongoing conversation may be monitored and recorded to determine various statistics, for example, number and durations of MutS, DbT, OnT, pause etc. of the ongoing conversation. For example, interactivity measures may include: voice activity during the conversation ("speech time divided by call duration"), how often the persons talk (number of talkspurts/call duration time), number of trials to take the floor, DbT time, OnT time and MutS time, conversation turns number and/or time etc.

Exemplary statistics may include maximum, median, minimum and average values together with skewness and kurtosis (e.g., for DbT, OnT, MutS, but other interactivity measures such as all those described above might also be used). Combination of statistical measures and/or combination of interactivity measures and statistical measures may be used to determine the interactivity level of the conversation. Different statistics analysis may be applied, for example, an analysis of whether measurement results fit normal distribution properties or not.

Statistics may be compared to one or more known values to determine which category of interactivity best fits the conversation. For example, conversation interactivity may be categorized in a number of levels, such as "low interactive," "high interactive," and "medium interactive." A "low interactive" conversation may be defined as a conversation in which no DbT periods are registered and participators start OnT periods during mutual silence time. In such a case, MutS distribution information can be compared to the system default RTT delay settings, and possible additional delay may be calculated. For example, additional delay may be calculated as the difference between MutS time and default RTT delay.

A conversation may be defined as "high interactive" if DbT situations are present, participants in the conversation start OnT during DbT periods, and MutS time is measured to be close to the system default RTT delay.

A "medium interactive" conversation classification is when the participants in the conversation start OnT periods during mutual silence time, but some DbT situations are present. In that case, not all of additional delay capacity may be used.

In some embodiments, a conversation can be configured to start with medium interactive system settings and different delay settings can be applied after carrying out interactivity measurements. For example, if measurements indicate the conversation is high interactive, the conversation shall get the lowest possible E2E delay and thus lowest adapted DT duration. If measurements indicate a low interactive conversation, additional delay may be added to improve the quality of the media or services (i.e., QoS). For example, the added delay time may be utilized in an error correction algorithm or to retransmit data (e.g., in a PS network).

In other embodiments, a system may use initial settings other than medium interactive. For example, a high interactive initial setting may be used to provide low initial E2E adaptive DT delay, and delay may be added if interactivity measurement indicates delay would provide an increase in perceived quality of service. Other embodiments may utilize the last or most recent setting characterization initial interactive system setting. It may be also possible to define initial interactive system setting using stored and periodically updated interactivity measurements statistics per country, subscription type, system configuration, connection type (two or more parts conversations), user level etc.

Figure 3:
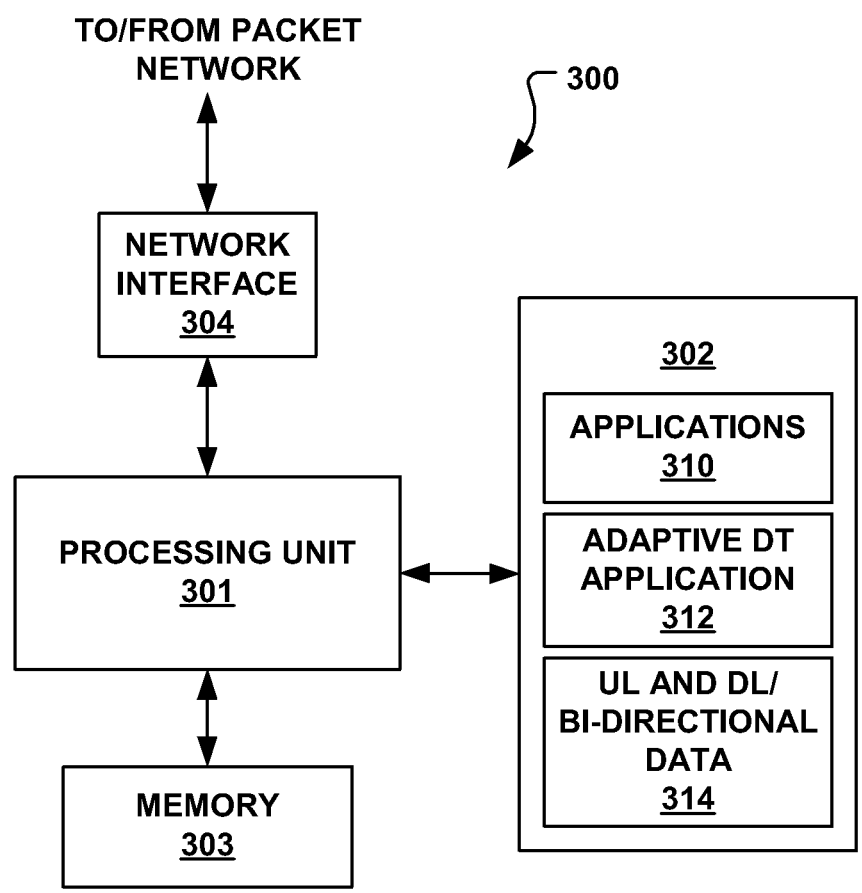
FIG. 3 is block diagram of an exemplary apparatus for controlling perceived QoS in accordance with embodiments.

The invention may be implemented in communications devices, such as those described with respect to FIG. 1, and in other systems devices and user equipment (UE) where both uplink (UL) and downlink (DL), or bi-directional data is available. Turning now to FIG. 3, an exemplary adjustable DT apparatus 300 according to some embodiments for use in such a communications device is schematically illustrated in a block diagram. The apparatus 300 in such a communications device includes at least one processing unit 301, at least one storage means 302, memory 303, and other units such as a communication circuit or network interface 304 and/or some other communication means (e.g., modem, router, switch etc.) for LAN and/or WAN connectivity, such as an IP WAN, Ethernet, Token Ring, Local Talk, X.25, ATM, ADSL, ISDN, GSM, 3G, or even an optical fiber connectivity link, serial communication or similar connectivity means, and connections/interfaces for external storage modules, and so on. For example, an implementation in a mobile terminal, such as mobile terminal 108 depicted in FIG. 1, would include, among other things, at least one radio communication unit with an antenna. Also, it will be understood that the network interface 304 may communicate via a packet switched network (e.g., a core IP WAN or other IP network such as the Internet), or via a circuit switched network (e.g., PTSN). The apparatus 300 also may include more than one network interface to receive data from both circuit switched and packet switched networks (e.g., audio and video respectively transmitted via circuit switched network and packet switched network).

The storage 302 is typically non-volatile (i.e., persistent) computer storage media that may include, but is not limited to, magnetic disk storage, magnetic cassettes, magnetic tape or other magnetic storage devices, ROM, CD-ROM, digital versatile disks (DVD) or other optical disk storage, EPROM, EEPROM flash memory and/or any other medium which may be used to store the desired information and which may accessed by the apparatus 300. Memory 303 is typically volatile memory located on or near the processing unit 301 (e.g., on the processor board) and may replicate all or parts of the data and/or program modules stored in non-volatile memory to enable fast memory access. Volatile memory includes, but is not limited to RAM, static RAM (SRAM), or other volatile memory technology. The storage means 302 and or memory 303 may include data and/or program modules that are executable by the processing unit 301. If the apparatus 300 is part of a distributive processing environment, storage 302 may include program modules located in local and/or remote computer storage media including memory storage devices.

The storage means 302 includes Applications module 310 that may include operating system programs and other applications related to the general or specific use of the apparatus 300; an Adaptive DT Application module 312 that may include one or more modules for carrying out the present invention; and UL and DL/Bi-Directional Data module 314, which includes data structures generated and used by the Adaptive DT Application module 312. While the storage 302 is shown as one unit in FIG. 3, it will be understood that any of the applications, data structures or other modules may be stored singly or in groups separate from one another. The storage 302 also may include other application modules, driver modules, data structures, and algorithms that may improve QoS such as error correction, adjustable jitter buffer, data retransmission algorithms, audio/video processing and/ or encoding algorithms, and any other processing algorithm/ device that can improve QoS (e.g. h263 vs. h264 video codecs) etc., which for brevity and practicality are not depicted in FIG. 3.

The communication circuit (or network interface) 304 receives information streams associated with a conversation from a packet-switched network. The information streams may include a variety of media, such as audio, video, audio video and/or text media. Each of the information streams may originate from a different participant and dynamically relate to one another in terms of interactive properties, such as MutS time, DbT time, interruptions, and/or OnT parts of the conversation. The Adaptive DT Application module 312 instructs the processing unit 301 to monitor the information streams of the conversation and detect occurrences characteristic of one or more interactivity properties associated with the information streams. A detected occurrence may be, for example, an amount, type, distribution and/or frequency of one or more interactive properties. The detected occurrences may be stored as statistics in the UL and DL/Bi-Directional Data module 314 and/or stored in the memory 303.

Based on detected occurrences, the processing unit 301 sets an E2E DT duration. This may be carried out by comparing statistics of detected events associated with monitored interactivity properties. Thus, the apparatus 300 may determine whether a particular delay time would be required or acceptable to provide a flexible DT duration, and consequently to provide a correspondingly flexible amount of QoS application to improve media and services quality in a way that is not practical or possible using a fixed or hard DT.

Some exemplary embodiments (e.g., apparatus 300) in which the invention may be implemented include a communications device that applies echo suppression because such devices have access to bi-directional speech activity data. In other embodiments, the invention may be implemented in communications terminals capable of using knowledge about additional delay to increase/decrease jitter buffer size in a mobile terminal or system (e.g., a system or terminal having an adaptive jitter buffer). Base station systems (e.g., radio base stations (RBSs), base transceiver stations (BTSs), WiMAX BSs etc.), which are capable of using additional delay for erroneous or lost packets retransmission, also may implement the invention. A GW, such as those described in connection with FIG. 1, is another example of a device having access to information flows that belong to a same conversation, and knowledge about additional delay derived from conversation interactivity measurements may be used to prioritize packets belonging to more interactive conversations.

A communications device in which the invention may be implemented may include any of the devices depicted in FIG. 1, and other devices such as mobile terminals (e.g., a cellular mobile terminal); a personal communication terminal that may combine a cellular mobile terminal with data processing and data communications capabilities; a personal data assistance (PDA) that can include one or more wireless transmitters and/or receivers, pager, Internet/intranet access, local area network interface, wide area network interface, Web browser, organizer, and/or calendar; an IP phone; a personal computer (PC) with communications capability; a mobile computer; a server computer (e.g., a network based server and/or application server (e.g. conference bridge)); a router, switch, or hub; a gateway device or other device that includes one or more wired or wireless transmitters and/or receivers.

In some embodiments, different devices that implement interactivity measurement and belong to the same signal processing chain and transport channel may distribute delay time capacity signaling between them.

Conversations that have different interactive properties can be handled differently by a system implementing the invention. For example, conversations having higher interactivity are more time critical and therefore may be prioritized by a system before other conversations. More system resources may be allocated and/or used for such high interactive conversations (e.g., at the expense of conversations with low interactivity), which may lead to higher user satisfaction.

Figure 4:
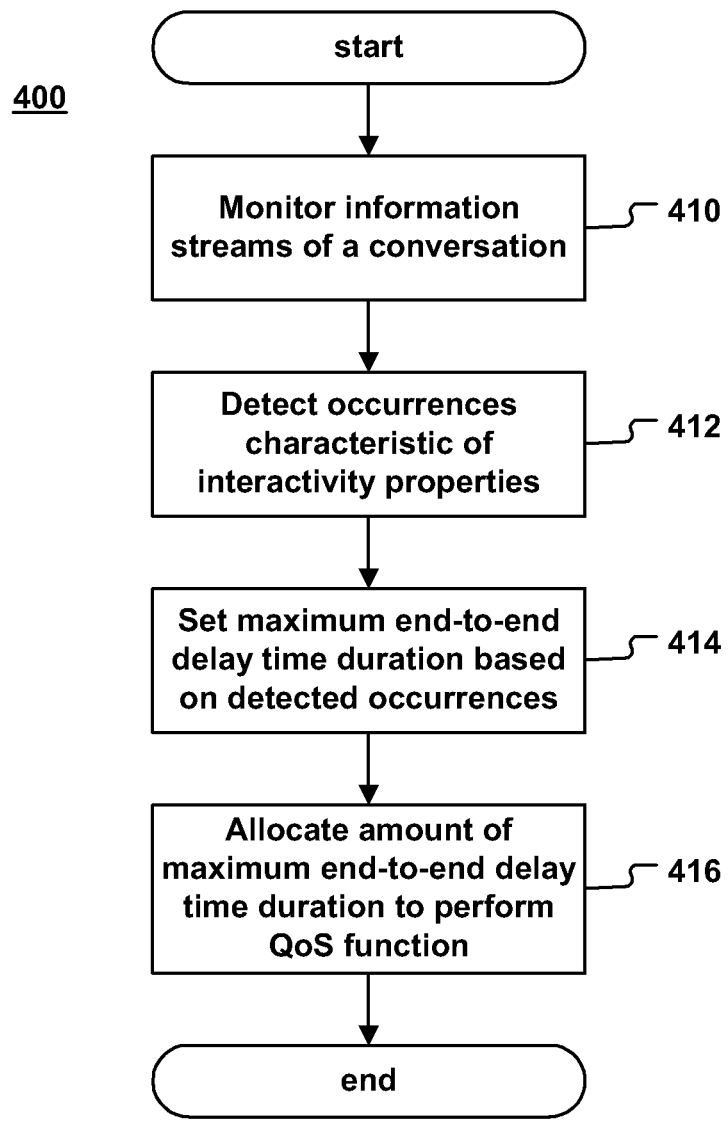
FIG. 4 is a flowchart diagram illustrating an exemplary procedure for controlling perceived quality of service (QoS) in accordance with some embodiments.

With reference now to FIG. 4, a procedure 400 depicts an exemplary method for controlling perceived quality of service (QoS). The method comprises a process 410 of monitoring information streams of a conversation for at least one interactivity property. Each of the streams being monitored originates from a different participant in the conversation. The next process 412 detects any occurrences that are characteristic of at the least one interactivity property associated with the information streams of the conversation. Each of processes 410 and 412 may run concurrently for a predetermined period of time, or continuously while the conversation is active. In process 414, a "maximum" E2E delay time duration amount based on the detected occurrences is determined. This maximum value is an adaptive DT value, which is used in process 416 to determine whether an amount of the maximum E2E delay time duration should be allocated to perform at least one QoS application (e.g., an application involving error correction, adjustable jitter buffer and/or data retransmission algorithm).

It will be appreciated that the present invention facilitates a number of advantages and benefits when implemented in applications involving communications devices and/or systems. For instance, the present invention avoids use of hard delay limits for conversational services that are associated with a DT derived from subjective tests. For example, the International Telecommunications Union Standardization Sector (ITU-T) recommends that a one-way transmission time E2E delay of voice transmission quality not exceed 400 ms (see, 3GPP TS 22.105, "Services and service capabilities" (Release 8)), even though a 500 ms delay can be regarded as acceptable according to conversation subjective tests (see, 3GPP TR 26.935, "Packet-switched conversational multimedia applications; Performance characterization of default codecs" (Release 7)).

A human subject's E2E delay perception, on one hand, may be affected by that subject's conversation skills, and psychology, and the conversation subject importance during information exchange (e.g., a conversation participator's reaction time can be higher than an E2E delay introduced by a system). On the other hand, the interactivity level may be determined by aforementioned human subject's importance, psychology and conversational skills. By monitoring and measuring conversational interactivity, the present invention can advantageously utilize real-time service perception that may depend on conditions that are created by service users participating in a conversation. The adjustable delay provided by the present invention also avoids a case where a system is designed about a fixed DT higher than a delay that the system can provide, and where such a fixed DT may be too generous for conversation conditions that do not allow any delay above an absolute possible minimum delay that can be introduced by the system.

The present invention also avoids other scenarios in which a predetermined and subjectively defined DT may not take into account conversation conditions involving human subjects that accept or do not perceive long E2E delays, which may result in system overloads and/or failed attempts to achieve perception of high service quality.

Another exemplary advantage of the present invention is that it may be implemented at a point in a system at which conversation interactive property measurements can be made and where it is possible to adaptively switch on and off additional processing algorithms and devices (that are placed within the system or in UE, such as mobile terminals) in correspondence with one or more measured conversation condition(s). That will lead at least conversational services perceptual quality improvement. For example, users that usually have highly interactive conversations should get fast communication channel and perceive high service quality (faster communication). Other users that converse with low interactivity will be satisfied using a communication channel having a long E2E delay, which can be used for media processing and transport algorithms or solutions to improve media and/or services quality (e.g., error correction, data retransmission or other processing algorithms).

If conversations that are more interactive, and thus time critical are prioritized by a system before other conversations with lower interactivity, more system resources may be used for the higher interactive conversation at the expense of the conversation with low interactivity. This generally will lead to higher user satisfaction.

It will be apparent to those skilled in the art that various changes and modifications can be made in the method and apparatus of the present invention, in which QoS is controlled based on an adaptive delay adjusted for real time media based on conversational interactivity measurement, without departing from the spirit and scope thereof. Thus, it is intended that the present invention cover the modifications of this invention provided they come within the scope of the appended claims and their equivalents.

What is claimed is:

1. A method for controlling perceived quality of service (QoS), the method comprising:
    monitoring information streams of a conversation for at least one interactivity property describing how those information streams dynamically relate to one another, each of said streams originating from a different participant of the conversation;
    detecting occurrences characteristic of the at least one interactivity property associated with the information streams of the conversation, the detected occurrences indicating a level of conversational interactivity between different participants of the conversation;
    setting a maximum end-to-end (E2E) delay time duration for the information streams of the conversation based on the level of said conversational interactivity indicated by the detected occurrences, by setting the maximum E2E delay time duration to a relatively higher value when the detected occurrences indicate a relatively lower level of said conversational interactivity and to a relatively lower value when the detected occurrences indicate a relatively higher level of said conversational interactivity; and
    determining whether to allocate an amount of the maximum E2E delay time duration to perform at least one QoS application on the information streams of the conversation, based on whether an E2E delay time duration measured for the information streams of the conversation is below the maximum E2E delay time duration.

2. The method according to claim 1, wherein the information streams comprise audio data.

3. The method according to claim 1, wherein the information streams comprise video data.

4. The method according to claim 1, wherein the information streams are transmitted via at least one of a packet-switched network and a circuit switched network.

5. The method according to claim 1, wherein one monitored interactivity property comprises mutual silence periods between information blocks of the information streams, and wherein detected occurrences characteristic of that monitored interactivity property comprise a duration and distribution of said mutual silence periods.

6. The method according to claim 1, wherein one monitored interactivity property comprises double talk periods between information blocks of the information streams, and wherein detected occurrences characteristic of that monitored interactivity property comprise a frequency and duration of said double talk periods.

7. The method according to claim 1, wherein one monitored interactivity property comprises one-talk time periods, a one-talk time period comprising a time period when a single one of said participants starts talking or providing visual information, and wherein detected occurrences characteristic of that monitored interactivity property comprises a tendency of one or more of said participants to start one-talk time periods during mutual silence or double talk periods between information blocks of the information streams.

8. The method according to claim 1, wherein the QoS application comprises at least one of an error correcting algorithm, a jitter buffer, a retransmission algorithm, an audio processing algorithm, a video processing algorithm, an audio encoding algorithm, and a video encoding algorithm.

9. The method according to claim 1, further comprising prioritizing transport of packets belonging to a conversation having a relatively higher level of conversational interactivity over transport of packets belonging to a conversation having a relatively lower level of conversational interactivity, as indicated by said detected occurrences.

10. An apparatus for controlling perceived quality of service (QoS) of a system, the apparatus comprising:
    a packet-switched communication circuit that transmits and/or receives packet-switched information streams of a conversation, each said information stream transmitted from a different participant of the conversation;
    a processing unit; and
    a memory configured to store at least one QoS program module and an adaptive delay threshold (DT) program module that, when executed by the processing unit, causes the processing unit to:
        monitor the information streams of the conversation for at least one interactivity property describing how those information streams dynamically relate to one another;
        store in the memory data related to detected occurrences of each of said at least one interactivity property, the detected occurrences indicating a level of conversational interactivity between different participants of the conversation;
        set a maximum end-to-end (E2E) delay time duration for the information streams of the conversation based on the level of said conversational interactivity indicated by the detected occurrences, by setting the maximum E2E delay time duration to a relatively higher value when the detected occurrences indicate a relatively lower level of said conversational interactivity and to a relatively lower value when the detected occurrences indicate a relatively higher level of said conversational interactivity; and
        determine whether to allocate an amount of the maximum E2E delay time duration to performance by the at least one QoS program module of at least one QoS application on the information streams of the conversation, based on whether an E2E delay time duration measured for the information streams of the conversation is below the maximum E2E delay time duration.

11. The apparatus according to claim 10, wherein the apparatus is a mobile terminal communication device.

12. The apparatus according to claim 10, wherein the apparatus is a base station system.

13. The apparatus according to claim 10, wherein the apparatus is a network gateway.

14. The apparatus according to claim 10, further comprising a jitter buffer.

15. The apparatus according to claim 10, wherein the information streams comprise audio data.

16. The apparatus according to claim 10, wherein the information streams comprise video data.

17. The apparatus according to claim 10, wherein one monitored interactivity property comprises mutual silence periods between information blocks of the information streams, and wherein detected occurrences characteristic of that monitored interactivity property comprise a duration and distribution of said mutual silence periods.

18. The apparatus according to claim 10, wherein one monitored interactivity property comprises double talk periods between information blocks of the information streams, and wherein detected occurrences characteristic of that monitored interactivity property comprise a frequency and duration of said double talk periods.

19. The apparatus according to claim 10, wherein one monitored interactivity property comprises one-talk time periods, a one-talk time period comprising a time period when only one of said participants is talking or providing visual information, and wherein detected occurrences characteristic of that monitored interactivity property comprises a tendency of one or more of said participants to start one-talk time periods during mutual silence or double talk periods between information blocks of the information streams.

20. The apparatus according to claim 10, wherein the QoS program module performs a QoS application that comprises at least one of an error correcting algorithm, a jitter buffer, a retransmission algorithm, an audio processing algorithm, a video processing algorithm, an audio encoding algorithm, and a video encoding algorithm.

21. The apparatus according to claim 10, wherein the adaptive DT program prioritizes transport of packets belonging to a conversation having a relatively higher level of conversational interactivity over transport of packets belonging to a conversation having a relatively lower level of conversational interactivity, as indicated by said detected occurrences.

22. The method of claim 1, wherein the detected occurrences comprise one or more statistical measures describing statistics of the at least one interactivity property over a period of time for the information streams of the conversation, and further comprising analyzing the one or more statistical measures to determine the level of said conversational interactivity.

23. The method of claim 1, further comprising at least one of:
categorizing the level of said conversational activity as high if the detected occurrences indicate one or more of the participants tend to start one-talk time periods during double talk periods between information blocks of the information streams, and times of mutual silence periods between information blocks of the information streams are within a predetermined margin of a default round-trip time delay;
categorizing the level of said conversational activity as low if the detected occurrences indicate the participants each tend to start one-talk time periods during mutual silence periods between information blocks of the information streams and no double talk periods between information blocks of the information streams are present; and
categorizing the level of said conversational activity as medium if the detected occurrences indicate the participants each tend to start one-talk time periods during mutual silence periods between information blocks of the information streams but one or more double talk periods between information blocks of the information streams are present.

24. The apparatus of claim 10, wherein the detected occurrences comprise one or more statistical measures describing statistics of the at least one interactivity property over a period of time for the information streams of the conversation, and wherein the adaptive delay threshold program module causes the processing unit to analyze the one or more statistical measures to determine the level of said conversational interactivity.

25. The apparatus of claim 10, wherein the adaptive delay threshold program module causes the processing unit to at least one of:
categorize the level of said conversational activity as high if the detected occurrences indicate one or more of the participants tend to start one-talk time periods during double talk periods between information blocks of the information streams, and times of mutual silence periods between information blocks of the information streams are within a predetermined margin of a default round-trip time delay;
categorize the level of said conversational activity as low if the detected occurrences indicate the participants each tend to start one-talk time periods during mutual silence periods between information blocks of the information streams and no double talk periods between information blocks of the information streams are present; and
categorize the level of said conversational activity as medium if the detected occurrences indicate the participants each tend to start one-talk time periods during mutual silence periods between information blocks of the information streams but one or more double talk periods between information blocks of the information streams are present.

* * * * *